(12) United States Patent
Park et al.

(10) Patent No.: US 12,524,908 B2
(45) Date of Patent: Jan. 13, 2026

(54) METHOD AND APPARATUS WITH OBJECT TRACKING

(71) Applicant: SAMSUNG ELECTRONICS CO., LTD., Suwon-si (KR)

(72) Inventors: Changbeom Park, Suwon-si (KR); Dongwook Lee, Suwon-si (KR); Byung In Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

(21) Appl. No.: 18/311,340

(22) Filed: May 3, 2023

(65) Prior Publication Data
US 2024/0144527 A1     May 2, 2024

(30) Foreign Application Priority Data
Nov. 1, 2022   (KR) .................. 10-2022-0143545

(51) Int. Cl.
*G06T 7/00* (2017.01)
*G06T 7/62* (2017.01)
*G06T 7/66* (2017.01)
*G06T 7/73* (2017.01)

(52) U.S. Cl.
CPC .................. *G06T 7/74* (2017.01); *G06T 7/62* (2017.01); *G06T 7/66* (2017.01); *G06T 2207/20081* (2013.01)

(58) Field of Classification Search
None
See application file for complete search history.

(56) References Cited

U.S. PATENT DOCUMENTS

| 2017/0061241 | A1* | 3/2017 | Rastgar ............... G06V 20/48 |
| 2019/0130189 | A1 | 5/2019 | Zhou et al. |
| 2022/0138493 | A1 | 5/2022 | Lee et al. |
| 2022/0391621 | A1* | 12/2022 | Chen .................. G06V 20/52 |

FOREIGN PATENT DOCUMENTS

| KR | 10-2139582 B1 | 7/2020 |
| KR | 10-2387357 B1 | 4/2022 |

(Continued)

OTHER PUBLICATIONS

Yan, Bin, et al. "Learning spatio-temporal transformer for visual tracking." *Proceedings of the IEEE/CVF international conference on computer vision.* (2021). pp. 10448-10457.

(Continued)

*Primary Examiner* — Joseph R Haley
(74) *Attorney, Agent, or Firm* — NSIP Law (57) ABSTRACT

An object tracking apparatus is provided. The object tracking apparatus includes a processor configured to detect, from a first image frame, an amodal region including a first visible region in which a target object is visible and an occlusion region in which the target object is occluded, determine, based on the detected amodal region of the first image frame, that at least a partial region of a second image frame is a search region of the second image frame, the second image frame being temporally adjacent to the first image frame, and track the target object in the second image frame based on the determined search region.

21 Claims, 7 Drawing Sheets

(56) References Cited

FOREIGN PATENT DOCUMENTS

| KR | 10-2022-0059194 A | 5/2022 |
|---|---|---|
| KR | 10-2428744 B1 | 8/2022 |

OTHER PUBLICATIONS

Li, Bo, et al. "Siamrpn++: Evolution of siamese visual tracking with very deep networks." *Proceedings of the IEEE/CVF conference on computer vision and pattern recognition.* (2019). pp. 4282-4291.

Li, Bo, et al. "High performance visual tracking with siamese region proposal network." *Proceedings of the IEEE conference on computer vision and pattern recognition.* (2018). pp. 8971-8980.

Oksama, Lauri, et al. "Position tracking and identity tracking are separate systems: Evidence from eye movements." *Cognition* vol. 146 (2016). pp. 393-409.

Korean Office Action issued on Jun. 1, 2025, in corresponding Korean Patent Application No. 10-2022-0143545. (3pages in English, 5pages in Korean).

Song, Shuran, and Jianxiong Xiao. "Deep Sliding Shapes for Amodal 3D Object Detection in RGB-D Images." Proceedings of the IEEE Conference on Computer Vision and Pattern Recognition. Dec. 31, 2016. (pp. 808-816).

\* cited by examiner

METHOD AND APPARATUS WITH OBJECT TRACKING

CROSS-REFERENCE TO RELATED APPLICATIONS

This application claims the benefit under 35 USC § 119(a) of Korean Patent Application No. 10-2022-0143545, filed on Nov. 1, 2022, in the Korean Intellectual Property Office, the entire disclosure of which is incorporated herein by reference for all purposes.

BACKGROUND

1. Field

The following description relates to a method and device with object tracking.

2. Description of Related Art

Technical automation of a recognition process may be implemented using, as a non-limited example, a neural network model implemented by a processor as a special calculation structure, which may provide computationally intuitive mapping between an input pattern and an output pattern after considerable training. The trained ability to perform such mapping may be referred to as a learning ability of the neural network. Moreover, such a specialized and specially trained neural network, due to the special training, may have a generalization ability that allows the network to generate a relatively accurate output for an input pattern on which the network is not trained.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented method includes detecting, from a first image frame, an amodal region comprising a first visible region in which a target object is visible and an occlusion region in which the target object is occluded; determining, based on the detected amodal region of the first image frame, that at least a partial region of a second image frame is a search region of the second image frame, the second image frame being temporally adjacent to the first image frame; and tracking the target object in the second image frame based on the determined search region.

The method may further include executing computer readable code, stored in a non-transitory computer-readable storage medium, by a processor and configuring the processor, through the execution, to perform operations of detecting the amodal region comprising the first visible region, the determining that at least a partial region of a second image frame is a search region, and the tracking of the target object in the second image frame.

The tracking of the target object in the second image frame may include detecting, in the search region, a modal region comprising a second visible region in the second image frame in which the target object is visible.

The detecting of the amodal region may include detecting, from the first image frame, the amodal region comprising the first visible region in which the target object is visible, and detecting the occlusion region in which another object is visible instead of the target object.

The detecting of the amodal region may include detecting, from the first image frame, a modal region comprising the first visible region in which the target object is visible; and detecting the amodal region which includes at least a portion of the modal region.

The tracking of the target object may include detecting an amodal region of the second image frame; and detecting a difference between the amodal region of the first image frame and the amodal region of the second image frame, where the difference is less than or equal to a threshold between the amodal region of the first image frame and the amodal region of the second image frame; wherein the difference is determined based on any one, or any combination of, a center, a size, or an area of at least one of the amodal region of the first image frame and the amodal region of the second image frame.

The determining that at least the partial region of the second image frame is the search region may include determining the search region, wherein the search region has a center that is identical to a center of the amodal region of the first image frame, and has a size that is increased by a predetermined ratio from a size of the amodal region of the first image frame.

The detecting of the amodal region may include detecting, in a search region of the first image frame determined from partial regions of the first image frame, the amodal region of the first image frame by applying a machine learning model to a template image corresponding to the target object and the search region of the first image frame.

The tracking of the target object may include detecting a modal region of the second image frame by applying a machine learning model to a template image corresponding to the target object and the search region.

The tracking of the target object in the second image frame may include extracting, based on at least one of a modal region of the first image frame and the amodal region of the first image frame, a template image corresponding to the target object from the first image frame; and tracking the target object in the search region of the second image frame based on the extracted template image.

The tracking of the target object may include, in response to a difference between a modal region of the first image frame and the amodal region of the first image frame being greater than or equal to a threshold, preventing a template image based on the first image frame from being updated.

In a general aspect, an apparatus includes one or more processors configured to detect, from a first image frame, an amodal region comprising a first visible region in which a target object is visible and an occlusion region in which the target object is occluded, determine, based on the detected amodal region of the first image frame, that at least a partial region of a second image frame is a search region of the second image frame, the second image frame being temporally adjacent to the first image frame, and track the target object in the second image frame based on the determined search region.

The processor may be configured to detect, in the search region, a modal region comprising a second visible region in the second image frame in which the target object is visible.

The processor may be configured to detect, from the first image frame, the amodal region comprising the first visible region in which the target object is visible, and detect the occlusion region in which another object is visible instead of the target object.

The processor may be configured to detect, from the first image frame, a modal region comprising the first visible region in which the target object is visible in the first image frame; and detect the amodal region which includes at least a portion of the modal region.

The processor may be configured to detect an amodal region of the second image frame; and detect a difference between the amodal region of the first image frame and the amodal region of the second image frame, where the difference may be less than or equal to a threshold between the amodal region of the first image frame and the amodal region of the second image frame; wherein the difference is determined based on any one, or any combination of, a center, a size, or an area of at least one of the amodal region of the first image frame and the amodal region of the second image frame.

The processor may be configured to determine the search region which has a center that is identical to a center of the amodal region of the first image frame, and has a size that is increased by a predetermined ratio from a size of the amodal region of the first image frame.

The processor may be configured to detect, in a search region of the first image frame determined from partial regions of the first image frame, the amodal region of the first image frame by applying a machine learning model to a template image corresponding to the target object and the search region of the first image frame.

The processor may be configured to detect a modal region of the second image frame by applying a machine learning model to a template image corresponding to the target object and the search region.

The processor may be configured to extract, based on at least one of a modal region of the first image frame and the amodal region of the first image frame, a template image corresponding to the target object from the first image frame; and track the target object in the search region of the second image frame based on the extracted template image.

Other features and aspects will be apparent from the following detailed description, the drawings, and the claims.

Throughout the drawings and the detailed description, unless otherwise described or provided, it shall be understood that the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as is commonly understood by one of ordinary skill in the art to which this disclosure pertains. Terms, such as those defined in commonly used dictionaries, should be construed to have meanings matching with contextual meanings in the relevant art and the present disclosure, and are not to be construed as having an ideal or excessively formal meaning unless otherwise defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, examples will be described in detail with reference to the accompanying drawings. In the descriptions of the examples referring to the accompanying drawings, like reference numerals refer to like elements and any repeated description related thereto has been omitted.

Figure 1:
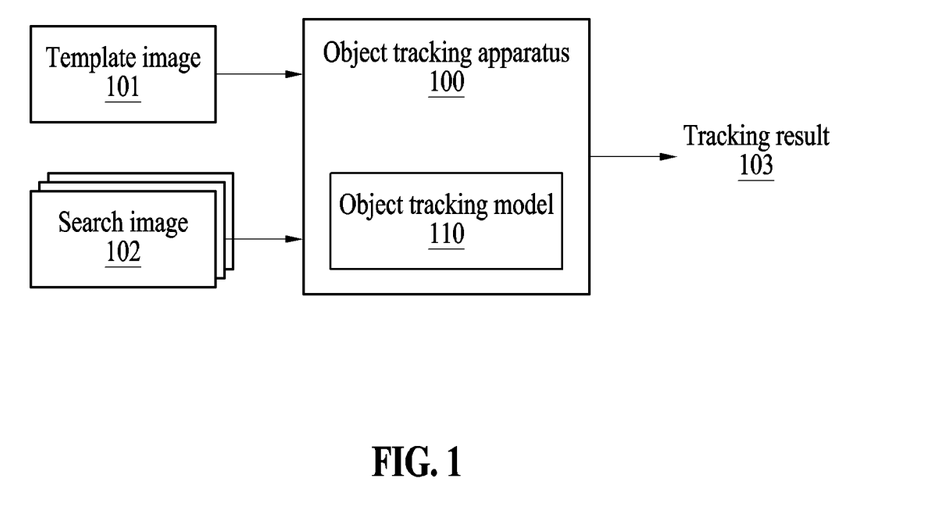
FIG. 1 illustrates an example configuration and an operation of an example object tracking apparatus, in accordance with one or more embodiments.

FIG. 1 illustrates an example of a configuration and an operation of an example object tracking apparatus, in accordance with one or more embodiments. The object tracking apparatus may include, as non-limiting examples, a laptop computer, a mobile phone, a smartphone, a tablet personal computer (PC), a mobile Internet device (MID), a personal digital assistant (PDA), an enterprise digital assistant (EDA), a digital still camera, a digital video camera, a portable multimedia player (PMP), a personal or portable navigation device (PND), a handheld game console, an e-book, a smart device, and the like. The smart device may include, for example, a smart watch and a smart band.

Referring to FIG. 1, an object tracking apparatus 100 may output a tracking result 103 based on a template image 101 and a search image 102. The template image 101 may provide information on a target object to be tracked. The object tracking apparatus 100 may track the target object in the search image 102 using the information on the target object provided by the template image 101. The tracking result 103 may include information on the target object in the search image 102. The tracking result 103 may include, for example, a position of the target object in the search image 102, a modal region of the target object in the search image 102, and an amodal region of the target object in the search image 102. The modal region of the target object may include a visible region in which the target object is visible in the search image, and the amodal region of the target object may include a visible region and an occlusion region in which the target object is occluded or covered by another object in the search image, which is described later with reference to FIG. 3. The tracking result 103 may be used to perform, as only examples, an automatic tracking operation, a zooming operation, and a focusing operation. However, these are only examples, and other operations may be performed.

In a non-limited example, the template image 101 and the search image 102 may correspond to a plurality of image frames of an input image. For example, the template image 101 may correspond to one of a plurality of image frames included in an input video file, and the search image 102 may correspond to at least one of the image frames after an image frame corresponding to the template image 101. According to another example, the template image 101 and the search image 102 may correspond to files that are independent of each other. In an example, the search image 102 may correspond to the input video file including the plurality of image frames, and the template image 101 may correspond to a still input image file that is not related to the input video file.

The template image 101 may include the target object, and the object tracking apparatus 100 may generate the tracking result 103 by tracking the target object in the search image 102. The template image 101 and the search image 102 may correspond to an entire corresponding image frame or a partial region of the corresponding image frame. In an example, the object tracking apparatus 100 may set a search region in the search image 102 and track the target object in the search region.

In an example, the object tracking apparatus 100 may generate the tracking result 103 using by implementing an object tracking model 110. The object tracking model 110 may include a neural network model that is based on machine learning. For example, the object tracking model 110 may include a deep neural network (DNN) including a plurality of layers. The plurality of layers may include an input layer, at least one hidden layer, and an output layer. The neural network model may be configured to perform, as non-limiting examples, object classification, object recognition, and image recognition by mutually mapping input data and output data in a nonlinear relationship based on deep learning. Such deep learning is indicative of processor implemented machine learning schemes.

The DNN may include one or more of a fully connected network (FCN), a convolutional neural network (CNN), and a recurrent neural network (RNN), an attention network, a self-attention network, and the like, or may include different or overlapping neural network portions respectively with such full, convolutional, or recurrent connections, according to an algorithm used to process information, as non-limiting examples. In an example, at least some of the plurality of layers in a neural network may correspond to the CNN and others may correspond to the FCN. In this example, the CNN may be referred to as a convolutional layer, and the FCN may be referred to as a fully connected layer.

For example, the neural network may be, or include, as only examples, a convolutional neural network (CNN), a recurrent neural network (RNN), perceptron, feed forward (FF), a radial basis network (RBF), deep feed forward (DFF), a long short term memory (LSTM), a gated recurrent unit (GRU), an autoencoder (AE), a variational autoencoder (VAE), a denoising autoencoder (DAE), a sparse autoencoder (SAE), Markov Chain (MC), a Hopfield network (HN), a Boltzmann machine (BM), a restricted Boltzmann machine (RBM), a Depp belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN), as non-limiting examples.

In the CNN, data input to each layer may be referred to as an input feature map, and data output from each layer may be referred to as an output feature map. The input feature map and the output feature map may be referred to as activation data. When the convolution layer corresponds to an input layer, an input feature map of the input layer may be an input image. In this example, an output feature map may be generated through a convolution operation between the input feature map and a weight kernel. The input feature map, the output feature map, and the weight kernel may be distinguished by a unit of a tensor.

In an example, the neural network may be trained based on deep learning and may perform inference suitable for a training purpose by mapping input data and output data that are in a nonlinear relationship with each other. Deep learning is a machine learning technique that solves a problem such as recognizing an image or recognizing speech in a big data set. Deep learning may be construed as an optimization problem solving process of finding a point at which energy is minimized while training the neural network using prepared training data.

Through supervised or unsupervised deep learning, a structure of the neural network or a weight corresponding to a model may be obtained, and the input data and the output data may be mapped to each other through the weight. When a width and a depth of the neural network are sufficiently great, the neural network may have a capacity sufficient to implement a predetermined operation. The neural network may achieve an optimized performance by learning a sufficiently large amount of training data through an appropriate training process.

In the following description, the neural network may be represented as being trained "in advance." In an example, being trained "in advance" may mean being trained before an operation of the neural network begins. That the neural network "starts" may mean that the neural network is ready for inference. For example, that the neural network "starts" may include the meaning that the neural network is loaded into a memory, or that input data for inference is input into the neural network after the neural network is loaded into the memory.

The object tracking apparatus 100 may input the template image 101 and the search image 102 to the object tracking model 110, and obtain the tracking result 103 from an output of the object tracking model 110. The object tracking model 110 may be pre-trained to output the tracking result 103 based on the template image 101 and the search image 102 being input.

Figure 2:
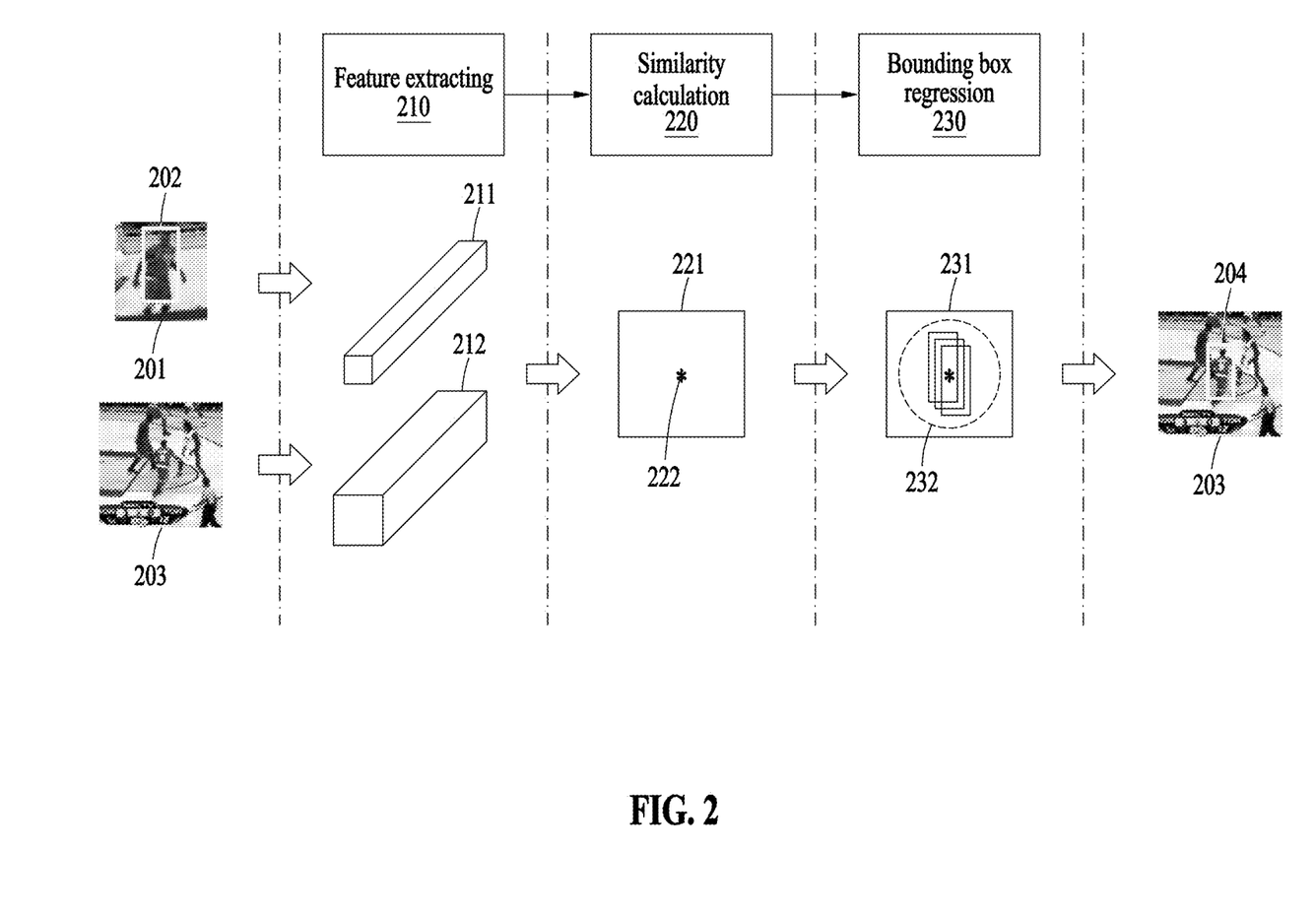
FIG. 2 illustrates an example of detailed operations of an example object tracking operation, in accordance with one or more embodiments.

FIG. 2 illustrates an example of detailed operations of an object tracking operation, in accordance with one or more embodiments.

Referring to FIG. 2, an example object tracking apparatus may perform object tracking based on a feature extracting operation 210, a similarity calculation operation 220, and bounding box regression 230. Any one or any combination of the feature extracting 210, the similarity calculation 220, or the bounding box regression 230 may be performed through an object tracking model. In an example, the object tracking model may include any one or any combination of a feature extracting network to perform the feature extracting operation 210, a similarity calculation network to perform the similarity calculation operation 220, and a bounding box regression network to perform the bounding box regression 230. The feature extracting network, the similarity calculation network, and the bounding box regression network may each correspond to a neural network. As an example, the object tracking model may include a Siamese network.

The object tracking apparatus may extract a template feature map 211 from a template image 201 and extract a search feature map 212 from a search image 203. The object tracking apparatus may extract the feature map 211 and the search feature map 212 using the object tracking model and/or a feature extracting model that share parameters. FIG. 2 illustrates an example in which the template image 201 corresponds to a partial region of an image frame (hereinafter referred to as an n-th image frame) of a video and the search region 203 corresponds to a partial region of a subsequent image frame (hereinafter referred to as an n+1-th image frame) of the image frame.

When a target object is detected in the n-th image frame, at least a partial region of the n-th image frame may be designated as a target region 202. The target region 202 may include a region that may be used to update a template image. In an example, the target region 202 may be determined based on at least one of a modal region of the target object in the n-th image frame or an amodal region of the target object. In an example, the target region 202 may be an interior region of a bounding box. Target region 202 may be determined through position information (e.g., an x-coordinate and a y-coordinate) and size information (e.g., a width and a height) of a center thereof. It may be possible to determine that at least a portion of the n-th image frame is the template region 201 based on a position and a size of the target region 202. The search region 203 may be determined based on at least one of the template image 201 or the target region 202. In an example, the search region 203 may be determined in the n+1-th image frame based on a position and a size of the template image 201 in the n-th image frame. In an example, the search region 203 in the n+1-th image frame may be determined based on the position and the size of the target region 202 in the n-th image frame.

A portion of the target object may be occluded or covered by another object in the n-th image frame, and the portion of the target object that is occluded may be visible in the n+1-th image frame. In this example, when the target region is determined based on a modal region of the n-th image frame, the modal region with a size thereof reduced, it may be possible to determine that a small region is the search region of the n+1-th image frame. When the portion of the target object that is occluded by the other object in the n-th image frame becomes visible in the n+1-th image frame, an area of the modal region of the target object drastically increases. However, despite the increase, accuracy of object tracking in the n+1-th image frame may not be maintainable because the search region 203 is small.

The object tracking apparatus may determine the search region of the n+1-th image frame based on at least one of the modal region or the amodal region of the n-th image frame. The object tracking apparatus may determine, based on the amodal region, a search region that is larger than a search region that is determined based on the modal region. The object tracking apparatus may track the target object in a larger search region of the n+1-th image frame, the large search region determined by the amodal region, even when the area of the modal region of the target object drastically increases as the portion of the target object that is occluded by the other object in the n-th image frame becomes visible in the n+1-th image frame.

The object tracking apparatus may calculate or determine a similarity by comparing the template feature map 211 and the search feature map 212. The similarity calculation 220 may be performed through the similarity calculation network. The similarity calculation network may derive a cross-correlation between the template feature map 211 and the search feature map 212 through a cross-correlation layer. A calculation result may indicate a position in the search region 203 corresponding to information on the target object and/or the template feature map 211. For example, the calculation result may display a corresponding position 222 and/or a score of the corresponding position 222 on a search space 221 corresponding to the search region 203.

The object tracking apparatus may perform a regression analysis using bounding boxes 232 of the corresponding position 222 in a search space 231 corresponding to the search region 203. The object tracking apparatus may determine the target region 204 in the search region 203 through regression analysis and generate a tracking result based on the target region 204.

Figure 3:
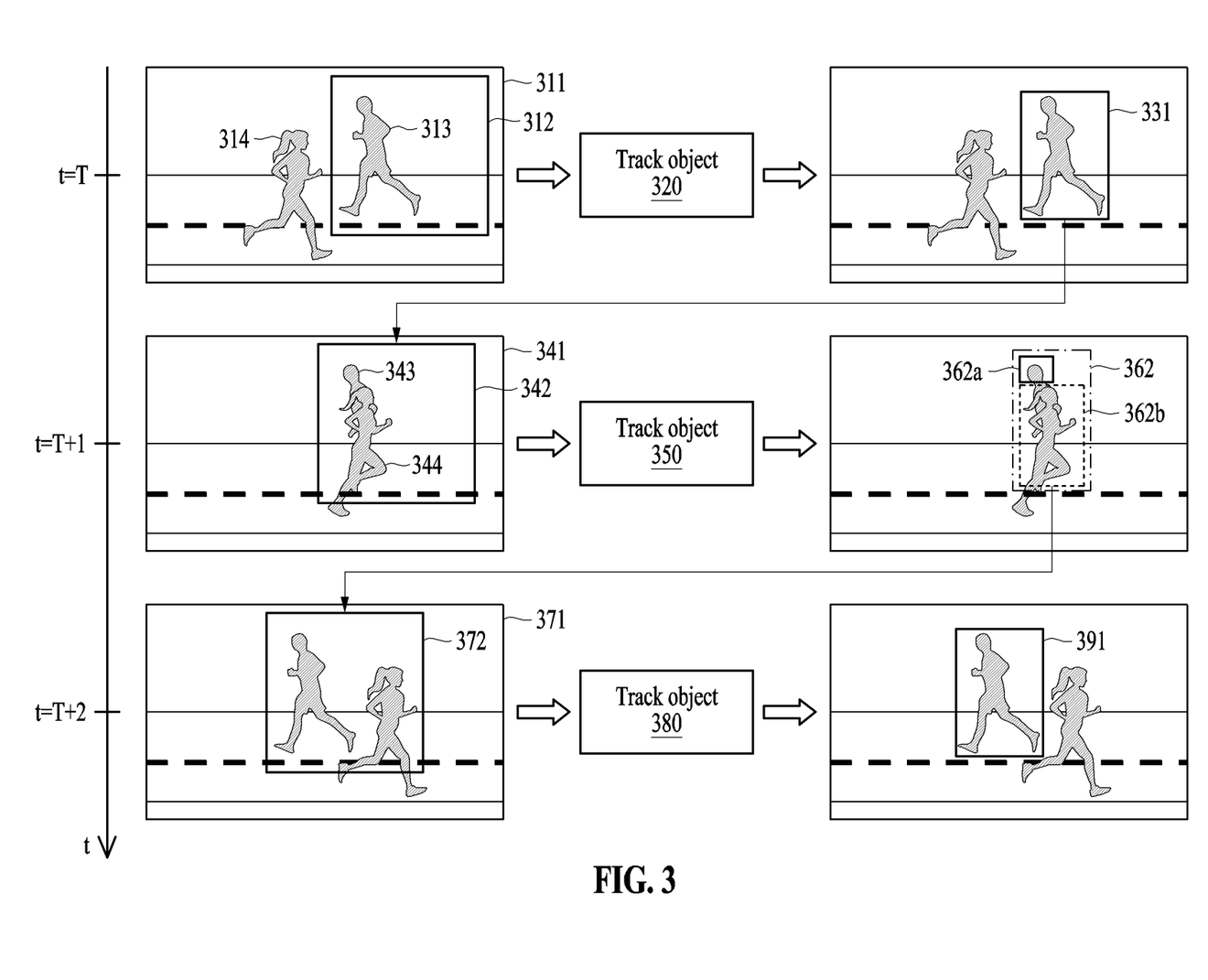
FIG. 3 illustrates an example object tracking operation using an amodal region, in accordance with one or more embodiments.

FIG. 3 illustrates an example of an object tracking operation using an amodal region, in accordance with one or more embodiments.

An object tracking apparatus may detect a modal region and an amodal region of a target object from an image frame. The object tracking apparatus may accurately track an object by determining a search region of a second image frame based on an amodal region of a first image frame even when the modal region of the target object drastically changes as the target object is occluded by another object.

The object tracking apparatus may perform an object tracking operation 320 based on a search region 312 of a T-th image frame 311 at a time (t=T) and determine a modal region and an amodal region in the search region 312. In an example, as illustrated in FIG. 3, a target object 313 may not be occluded by another object 314 in the T-th image frame 311. The object tracking apparatus may detect a modal region and an amodal region that is identical to the modal region from the T-th image frame 311. As illustrated in FIG. 3, the object tracking apparatus may detect a region 331 as the modal region and the amodal region. The object tracking apparatus may determine a search region 342 of a T+1-th image frame 341 based on the amodal region of the T-th image frame 311.

The object tracking apparatus may perform an object tracking operation 350 based on the search region 342 of the T+1-th image frame 341 at a time (t=T+1) and determine a modal region 362a and an amodal region 362 in the search region 342. For example, as illustrated in FIG. 3, a target object 343 may be occluded by another object 344 in the T+1-th image frame 341. The object tracking apparatus may detect the modal region 362a and the amodal region 362 from the T+1-th image frame 341. The modal region 362a may include a visible region in which the target object 343 is visible in the T+1-th image frame 341. The amodal region 362 may include a visible region (e.g., the modal region 362a) and an occlusion region 362b in which the target object 343 is occluded by the other object 344. The object tracking apparatus may determine a search region 372 of a T+2-th image frame 371 based on the amodal region 362.

The object tracking apparatus may perform an object tracking operation 380 based on the search region 372 of the T+2-th image frame 371 at a time (t=T+2) and determine a modal region and an amodal region in the search region 372. In an example, as illustrated in FIG. 3, the target object may not be occluded by the other object in the T+2-th image frame 371. The object tracking apparatus may detect a modal region and an amodal region that is identical to the modal region. The object tracking apparatus may detect a region 391 as the modal region and the amodal region.

Figure 4:
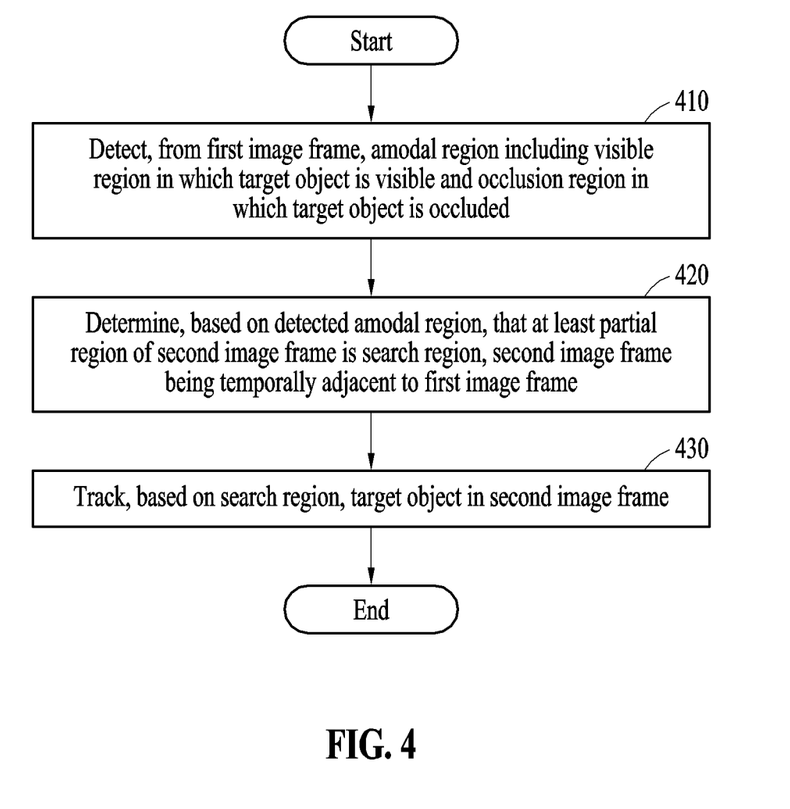
FIG. 4 illustrates an example operation of tracking an object using an amodal region, in accordance with one or more embodiments.

FIG. 4 illustrates an example of an operation of tracking an object using an amodal region, in accordance with one or more embodiments. The operations in FIG. 4 may be performed in the sequence and manner as shown. However, the order of some operations may be changed, or some of the operations may be omitted, without departing from the spirit and scope of the shown example. Additionally, operations illustrated in FIG. 4 may be performed in parallel or simultaneously. One or more blocks of FIG. 4, and combinations of the blocks, can be implemented by special purpose hardware-based computer that perform the specified functions, or combinations of special purpose hardware and instructions, e.g., computer or processor instructions. In addition to the description of FIG. 4 below, the descriptions of FIGS. 1-3 are also applicable to FIG. 4 and are incorporated herein by reference. Thus, the above description may not be repeated here for brevity purposes. The operations of FIG. 4 may be performed by a processor.

Referring to FIG. 4, in operation 410, an object tracking apparatus (e.g., the object tracking apparatus 100 of FIG. 1) may detect an amodal region from a first image frame.

The amodal region is a region corresponding to, or including, a target object. The amodal region may include a visible region in which the target object is visible in an image frame, and an occlusion region in which the target object is occluded in the image frame. The visible region may include a region in which the target object is visible in the image frame. The occlusion region may include a region in which the target object is occluded by another object. In an example, the occlusion region may include a region in which the other object is visible instead of the target object, or the other object at least partially covers the target object.

In an example, when at least a portion of the target object is not occluded by the other object in the image frame, the amodal region and the visible region may be identical to each other, and the occlusion region may be excluded from the amodal region. As another example, when a first portion of the target object is visible in the image frame and a second portion of the target object is occluded, the amodal region may include a visible region corresponding to the first portion of the target object, which is visible, and an occlusion region corresponding to the second portion of the target object, which is occluded. As another example, when the target object is occluded and not visible in the image frame, the amodal region and the occlusion region may be identical to each other, and the visible region (and the target object) may be excluded from the amodal region.

In an example, the object tracking apparatus may detect, from the first image frame, the modal region including the visible region in which the target object is visible in the first image frame. The object tracking apparatus may detect, from the first image frame, the amodal region including an interior of the modal region therein.

In an example, the object tracking apparatus may detect the modal region and the amodal region from the first image frame by implementing a machine learning model (e.g., the object tracking model 110 of FIG. 1). The object tracking apparatus may obtain a template image (e.g., the template image 101 of FIG. 1) corresponding to the target object. The object tracking apparatus may detect the modal region and the amodal region in a search region of the first image frame by applying the machine learning model to the template image and the search region of the first image frame. It may be possible to determine that a partial region of the first image frame is the search region of the first image frame. In an example, the search region of the first image frame may be determined based on a tracking result of another image frame (e.g., an image frame preceding the first image frame) that is temporally adjacent to the first image frame. In an example, the search region of the first image frame may be determined based on an input of designating at least the partial region as the search region.

According to an example, the object tracking apparatus may detect the amodal region from the first image frame based on the modal region of the first image frame. For example, the object tracking apparatus may detect the modal region from the first image frame. Thereafter, the object tracking apparatus may detect the amodal region from the first image frame based on the detected modal region of the first image frame. For example, the object tracking apparatus may detect the modal region from the first image frame by applying the object tracking model to the template image and the search region of the first image frame. The object tracking apparatus may detect the amodal region of the first image frame by applying the object tracking model to the template image, the search region of the first image frame, and the modal region of the first image frame.

Referring again to FIG. 4, in operation 420, the object tracking apparatus may determine that at least a partial region of a second image frame is a search region based on the detected amodal region of the first image frame.

In an example, the second image frame may include an image frame that is temporally adjacent to the first image frame. In an example, the first image frame may be one of a plurality of image frames of an input video related to the target object. The second image frame may be one of the plurality of image frames, which is temporally adjacent to the first image frame. For example, the second image frame may be a subsequent image frame that is temporally adjacent to the first image frame among the plurality of image frames.

The search region may be a region in which the target object is to be tracked in the second image frame. In an example, the object tracking apparatus may determine the search region of the second image frame using the tracking result of the first image frame and track the target object in the search region of the second image frame instead of tracking the target object in the entire second image frame. By tracking the target object in the partial region, or the search region, of the second image frame, compared to tracking the target object in the entire region of the second image frame, the object tracking apparatus may track the target object more efficiently and accurately with a reduced number of operations.

In an example, the object tracking apparatus may determine the search region of the second image frame based on the amodal region detected from the first image frame. The object tracking apparatus may determine a center and a size of the search region of the second image frame based on a center and a size of the amodal region of the first image frame. The object tracking apparatus may determine the search region having a center that is identical to a center of the amodal region of the first image frame. For example, the object tracking apparatus may determine that a point in the second image frame having position information (e.g., an x-coordinate and a y-coordinate) identical to position information of the center of the amodal region of the first image frame is the center of the search region of the second image frame. The object tracking apparatus may determine a size of the second image frame based on size information (e.g., a width and a height) of the amodal region of the first image frame. In an example, the object tracking apparatus may determine a search region of which a size is increased by a predetermined ratio from the size of the amodal region of the first image frame.

In operation 430, the object tracking apparatus may track the target object in the second image frame based on the search region.

The object tracking apparatus may detect the modal region in the search region of the second image frame. The modal region of the second image frame may include a visible region in which the target object is visible in the second image frame.

According to an example, the object tracking apparatus may detect the modal region from the second image frame by implementing the machine learning model (e.g., the object tracking model 110 of FIG. 1). The object tracking apparatus may obtain a template image (e.g., the template image 101 of FIG. 1) corresponding to the target object. The object tracking apparatus may detect the modal region in the search region of the second image frame by applying the machine learning model to the template image and the search region of the second image frame.

In an example, the object tracking apparatus may detect the amodal region from the second image frame by implementing the machine learning model. In an example, the object tracking apparatus may detect the amodal region of the second image frame by applying the machine learning model to the template image and the search region of the second image frame. In an example, the object tracking apparatus may detect the amodal region from the second image frame based on the modal region of the second image frame.

In an example, the object tracking apparatus may detect the modal region of the second image frame using a template image updated based on the tracking result of the first image frame. The object tracking apparatus may update the template image based on the tracking result of the first image frame. In an example, the template image may be updated based on at least one of the modal region or the amodal region detected from the first image frame. The object tracking apparatus may track the target object in the second image frame based on the updated template image. In an example, the object tracking apparatus may detect at least one of the modal region or the amodal region from the second image frame by applying the machine learning model to the updated template image and the search region of the second image frame. A template image update is described later with reference to FIGS. 6 and 7.

Figure 5:
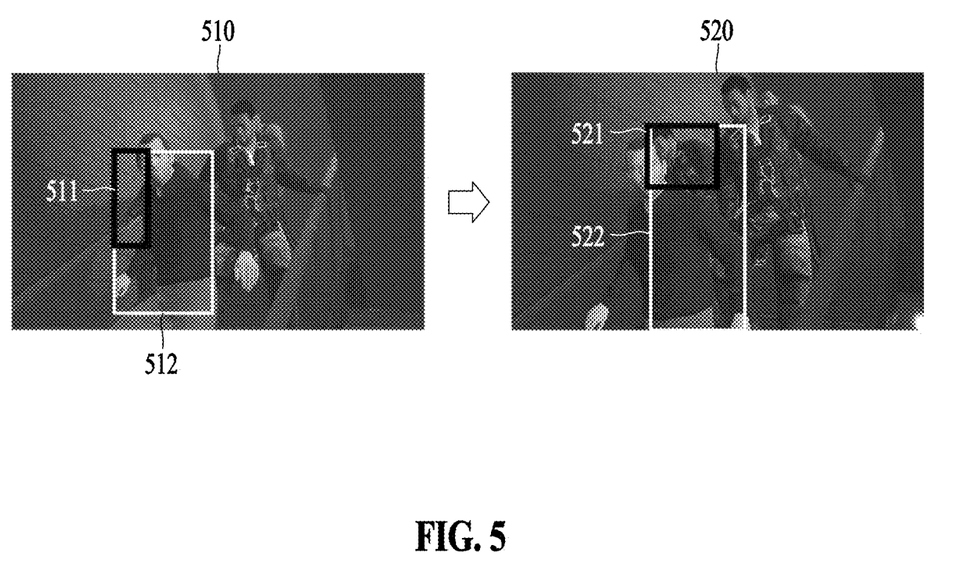
FIG. 5 illustrates an example amodal box and a modal box of image frames, in accordance with one or more embodiments.

FIG. 5 illustrates an example amodal box and a modal box of image frames, in accordance with one or more embodiments.

In an example, an object tracking apparatus may detect a modal region 511 and an amodal region 512 from a first image frame 510. The object tracking apparatus may detect a modal region 521 and an amodal region 522 from a second image frame 520. The second image frame 520 may be a subsequent image frame that is temporally adjacent to the first image frame 510.

According to an example, the object tracking apparatus may detect the amodal region 522 of the second image frame 520, where the amodal region 522 of the second image frame 520 is different from the amodal region 512 of the first image frame 510, wherein the difference is less than or equal to a threshold. The object tracking apparatus may detect the amodal region 522 of the second image frame 520, where the amodal region 522 has a difference that is calculated, based on any one or any combination of a center, a size, or an area of a region, for the amodal region 512 of the first image frame 510 and the amodal region 522 of the second image frame 520, wherein the difference is less than or equal to a threshold.

A region (e.g., a modal region and an amodal region) may be determined by a reference position and a size in an image frame. The reference position of the region may include coordinates of a center of the region in the image frame. The size of the region may include a width and a height of the region. For example, the region may be an interior of a corresponding bounding box, a position of the region may include coordinates of a center of the corresponding bounding box, and a size of the region may include a width and a height of the corresponding bounding box.

A difference between regions may be calculated based on any one, or any combination of, a center, a size, or an area. In an example, a difference between a first region and a second region may be calculated based on a distance between a reference position of the first region and a reference position of the second region. In an example, the difference between the first region and the second region may be calculated based on a difference between a width (or a height) of the first region and a width (or a height) of the second region. In an example, the difference between the first region and the second region may be determined based on a difference between an area of the first region and an area of the second region. In an example, the difference between the first region and the second region may be calculated based on an intersection over union (IoU) of the first region and the second region.

In an example, as illustrated in FIG. 5, a portion of a target object may be occluded by another object in the first image frame 510. The target object may be occluded by the other object to a different extent in the first image frame 510 and the second image frame 520. In an example, the portion of the target object occluded in the first image frame 510 may be at least partially visible in the second image frame 520.

Compared to the modal region 511 of the first image frame 510, the modal region 521 of the second image frame 520 may be a modal region that is changed by an independent change in the target object and a change in the target object in relation to the other object. The independent change in the target object may be a change in the target object that is independent of a change in the other object according to a change in an image frame, and may include, as only examples, a change in a position of the target object and a rotation of the target object. The change in the target object related to the other object may be a change in a position of the other object relative to the target object according to the change in the image frame, and may include, as an example, a change in a distance between the target object and the other object, a change in a size, a position, and an area of a portion of the target object that is occluded by the other object.

Compared to the amodal region 512 of the first image frame 510, the amodal region 522 of the second image frame 520 may be an amodal region that is changed based on the independent change in the target object. The amodal region 522 of the second image frame 520 may be a region that is changed from the amodal region 512 of the first image frame 510 based on the independent change in the target object and a region in which the change in the target object related to the other object is excluded. Since an amodal region includes an occlusion region in which a target object is occluded, a change in a position of another object relative to the target object may have no effect.

Since the first image frame 510 is an image frame that is temporally adjacent to the second image frame 520, the independent change in the target object between the first image frame 510 and the second image frame 520 may not be significant. A difference between the amodal region 512 of the first image frame 510 and the amodal region 522 of the second image frame 520 may be less than or equal to a threshold.

As illustrated in FIG. 5, as a region in which the target object is occluded by the other object varies in the first image frame 510 and the second image frame 520, there may be a change in the target object related to the other object as well as the independent change in the target object between the first image frame 510 and the second image frame 520. A region that has a most significant difference in any one or any combination of a center, a size, or an area compared to the modal region 511 of the first image frame 510 may be detected as the modal region 521 of the second image frame 520. According to an example, the difference between the amodal region 512 and the amodal region 522 may be less than a difference between the modal region 511 and the modal region 521.

Figure 6:
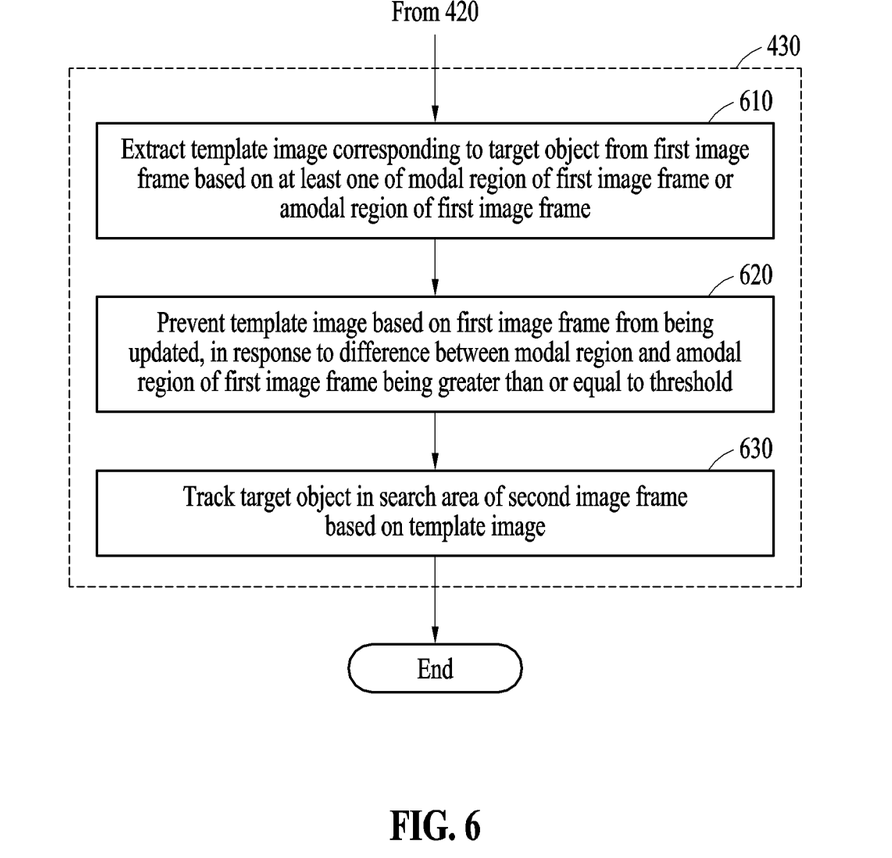
FIG. 6 illustrates an example operation of an example object tracking apparatus that updates a template image, in accordance with one or more embodiments.

FIG. 6 illustrates an example of an operation of an object tracking apparatus for updating a template image, in accordance with one or more embodiments. The operations in FIG. 6 may be performed in the sequence and manner as shown. However, the order of some operations may be changed, or some of the operations may be omitted, without departing from the spirit and scope of the shown example. Additionally, operations illustrated in FIG. 6 may be performed in parallel or simultaneously. One or more blocks of FIG. 6, and combinations of the blocks, can be implemented by special purpose hardware-based computer that perform the specified functions, or combinations of special purpose hardware and instructions, e.g., computer or processor instructions. In addition to the description of FIG. 6 below, the descriptions of FIGS. 1-5 are also applicable to FIG. 6 and are incorporated herein by reference. Thus, the above description may not be repeated here for brevity purposes. The operations of FIG. 6 may be performed by a processor.

In an example, an object tracking apparatus may update a template image based on a tracking result of a first image frame. The object tracking apparatus may track a target object from a second image frame based on the updated template image.

Referring to FIG. 6, in operation 610, the object tracking apparatus may extract a template image corresponding to the target object from the first image frame based on at least one of a modal region of the first image frame or an amodal region of the first image frame. The object tracking apparatus may update the template image based on the tracking result of the first image frame. For example, the object tracking apparatus may extract at least one of the modal region or the amodal region from the first image frame. The object tracking apparatus may update the template image based on at least one of the modal region or the amodal region extracted from the first image frame.

In an example, the object tracking apparatus may extract the template image from the first image frame based on the modal region of the first image frame. In an example, the object tracking apparatus may use the modal region of the first image frame as the template image.

In an example, the object tracking apparatus may extract the template image from the first image frame based on the modal region and the amodal region of the first image frame. In an example, the object tracking apparatus may use the modal region of the first image frame and at least a partial region of the second image frame as the template image. In an example, the partial region of the second image frame may be the modal region of the second image frame.

In operation 620, in response to a difference between the modal region and the amodal region of the first image frame being greater than or equal to a threshold, the object tracking apparatus may prevent the template image based on the first image frame from being updated.

In an example, the object tracking apparatus may prevent the template image from being updated based on a tracking result of the first image frame. In an example, when the target object is occluded too much by another object in the first image frame, the target object may not be readily or easily tracked in the second image frame based on a region in which the target object is visible in the first image frame. In response to a difference in area between the modal region and the amodal region of the first image frame being greater than or equal to a threshold area, the object tracking apparatus may prevent the template image based on the first image frame from being updated. The object tracking apparatus may use the template image used in the first image frame again to track the target object in the second image frame, which is described later.

In operation 630, the object tracking apparatus may track the target object in a search area of the second image frame based on the template image. The object tracking apparatus may detect a modal region of the second image frame in the search region of the second image frame based on the template image.

In an example, the object tracking apparatus may update the template image based on the tracking result of the first image frame. The object tracking apparatus may track the target object in the second image frame based on the updated template image. In an example, the object tracking apparatus may detect the modal region from the second image frame by applying a machine learning model (e.g., the object tracking model 110 of FIG. 1) to the updated template image and the search region of the second image frame.

In an example, the object tracking apparatus may prevent the template image based on the first image frame from being updated based on the tracking result of the first image frame. In an example, the object tracking apparatus may use the template image used in the first image frame again to track the target object in the second image frame. The object tracking apparatus may track the target object in the second image frame based on the template image used in the first image frame to track the target object in the first image frame. However, examples are not limited thereto, and the object tracking apparatus may also track the target object in the second image frame using a template image corresponding to a target object received from an external apparatus.

Figure 7:
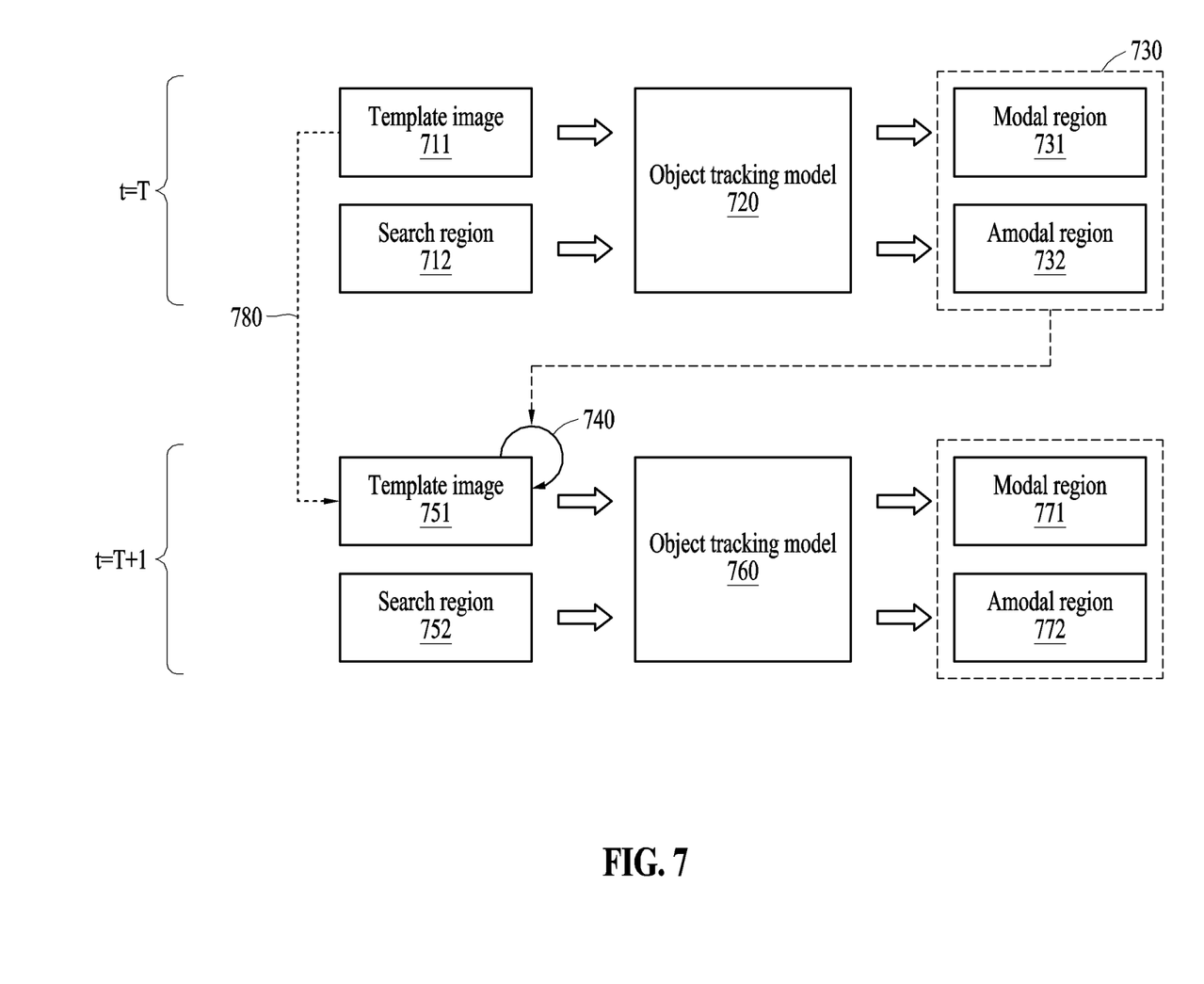
FIG. 7 illustrates an example operation of updating a template image and preventing the template image from being updated, in accordance with one or more embodiments.

FIG. 7 illustrates an example operation of updating a template image and preventing the template image from being updated.

An object tracking apparatus may track a target object in a T-th image frame at a time (t=T). In an example, the object tracking apparatus may apply an object tracking model 720 to a template image 711 corresponding to the target object and a search region 712 of the T-th image frame. The object tracking apparatus may detect a modal region 731 and an amodal region 732 from the T-th image frame by applying the object tracking model 720.

The object tracking apparatus may determine whether to update the template image based on a tracking result 730 of the T-th image frame. The object tracking apparatus may determine whether to update the template image based on the T-th image frame based on a difference between the modal region 731 and the amodal region 732.

For example, in response to the difference between the modal region 731 and the amodal region 732 extracted from the T-th image frame being less than a threshold, the object tracking apparatus may determine that the template image 751 is to be updated based on the T-th image frame. The object tracking apparatus may perform an operation of updating 740 the template image 751 based on the tracking result 730 of the T-th image frame. The template image 751 that is updated may be used to track the target object in a T+1-th image frame at a time (t=T+1).

In an example, in response to the difference between the modal region 731 and the amodal region 732 extracted from the T-th image frame being greater than or equal to the threshold, the object tracking apparatus may determine that the template image 751 based on the T-th image frame is prevented from being updated. The object tracking apparatus may prevent the operation of updating the template image 751 based on the tracking result 730 of the T-th image frame from being performed. The template image 751 that is prevented from being updated may be used to track the target object in the T+1-th image frame at the time (t=T+1).

The object tracking apparatus may track the target object in the T+1-th image frame at the time (t=T+1) using the template image 751. In an example, the object tracking apparatus may apply an object tracking model 760 to the template image 751 corresponding to the target object and the search region 752 of the T+1-th image frame. The object tracking apparatus may detect a modal region 771 and an amodal region 772 from the T+1-th image frame by applying the object tracking model 760.

The object tracking apparatus 100, and other devices of FIGS. 1-7, and other components described herein are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-7, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method, comprising:
    detecting, from a first image frame, an amodal region comprising a first visible region in which a target object is visible and an occlusion region in which the target object is occluded;
    determining, based on the detected amodal region of the first image frame, that at least a partial region of a second image frame is a search region of the second image frame, the second image frame being temporally adjacent to the first image frame; and
    tracking the target object in the determined search region of the second image frame,
    wherein the determining that at least the partial region of the second image frame is the search region comprises determining the search region has a size that is increased by a predetermined ratio from a size of the amodal region of the first image frame.

2. The method of claim 1, further comprising executing computer readable code, stored in a non-transitory computer-readable storage medium, by a processor and configuring the processor, through the execution, to perform operations of detecting the amodal region comprising the first visible region, the determining that at least a partial region of a second image frame is a search region, and the tracking of the target object in the second image frame.

3. The method of claim 1, wherein the tracking of the target object in the second image frame comprises detecting, in the search region, a modal region comprising a second visible region in the second image frame in which the target object is visible.

4. The method of claim 1, wherein the detecting of the amodal region comprises detecting, from the first image frame, the amodal region comprising the first visible region in which the target object is visible, and detecting the occlusion region in which another object is visible instead of the target object.

5. The method of claim 1, wherein the detecting of the amodal region comprises:
   detecting, from the first image frame, a modal region comprising the first visible region in which the target object is visible; and
   detecting the amodal region which includes at least a portion of the modal region.

6. The method of claim 1, wherein the tracking of the target object comprises:
   detecting an amodal region of the second image frame; and
   detecting a difference between the amodal region of the first image frame and the amodal region of the second image frame, where the difference is less than or equal to a threshold between the amodal region of the first image frame and the amodal region of the second image frame;
   wherein the difference is determined based on any one, or any combination of, a center, a size, or an area of at least one of the amodal region of the first image frame and the amodal region of the second image frame.

7. The method of claim 1, wherein the determining that at least the partial region of the second image frame is the search region comprises determining the search region, wherein the search region has a center that is identical to a center of the amodal region of the first image frame.

8. The method of claim 1, wherein the detecting of the amodal region comprises detecting, in a search region of the first image frame determined from partial regions of the first image frame, the amodal region of the first image frame by applying a machine learning model to a template image corresponding to the target object and the search region of the first image frame.

9. The method of claim 1, wherein the tracking of the target object comprises detecting a modal region of the second image frame by applying a machine learning model to a template image corresponding to the target object and the search region.

10. The method of claim 1, wherein the tracking of the target object in the second image frame comprises:
    extracting, based on at least one of a modal region of the first image frame and the amodal region of the first image frame, a template image corresponding to the target object from the first image frame; and
    tracking the target object in the search region of the second image frame based on the extracted template image.

11. The method of claim 1, wherein the tracking of the target object comprises, in response to a difference between a modal region of the first image frame and the amodal region of the first image frame being greater than or equal to a threshold, preventing a template image based on the first image frame from being updated.

12. A non-transitory computer-readable storage medium storing instructions that, when executed by a processor, cause the processor to perform the method of claim 1.

13. An apparatus, comprising:
    one or more processors configured to:
       detect, from a first image frame, an amodal region comprising a first visible region in which a target object is visible and an occlusion region in which the target object is occluded,
       determine, based on the detected amodal region of the first image frame, that at least a partial region of a second image frame is a search region of the second image frame, the second image frame being temporally adjacent to the first image frame, and
       track the target object in the determined search region of the second image frame,
    wherein the processor is configured to determine the search region has a size that is increased by a predetermined ratio from a size of the amodal region of the first image frame.

14. The apparatus of claim 13, wherein the processor is configured to detect, in the search region, a modal region comprising a second visible region in the second image frame in which the target object is visible.

15. The apparatus of claim 13, wherein the processor is configured to detect, from the first image frame, the amodal region comprising the first visible region in which the target object is visible, and detect the occlusion region in which another object is visible instead of the target object.

16. The apparatus of claim 13, wherein the processor is configured to:
    detect, from the first image frame, a modal region comprising the first visible region in which the target object is visible in the first image frame; and
    detect the amodal region which includes at least a portion of the modal region.

17. The apparatus of claim 13, wherein the processor is configured to:
    detect an amodal region of the second image frame; and
    detect a difference between the amodal region of the first image frame and the amodal region of the second image frame, where the difference is less than or equal to a threshold between the amodal region of the first image frame and the amodal region of the second image frame;
    wherein the difference is determined based on any one, or any combination of, a center, a size, or an area of at least one of the amodal region of the first image frame and the amodal region of the second image frame.

18. The apparatus of claim 13, wherein the processor is configured to determine the search region which has a center that is identical to a center of the amodal region of the first image frame.

19. The apparatus of claim 13, wherein the processor is configured to detect, in a search region of the first image frame determined from partial regions of the first image frame, the amodal region of the first image frame by applying a machine learning model to a template image corresponding to the target object and the search region of the first image frame.

20. The apparatus of claim 13, wherein the processor is configured to detect a modal region of the second image frame by applying a machine learning model to a template image corresponding to the target object and the search region.

21. The apparatus of claim 13, wherein the processor is configured to:
    extract, based on at least one of a modal region of the first image frame and the amodal region of the first image frame, a template image corresponding to the target object from the first image frame; and
    track the target object in the search region of the second image frame based on the extracted template image.

* * * * *